United States Patent
Takahashi (10) Patent No.: US 9,873,209 B2
(45) Date of Patent: Jan. 23, 2018

(54) MIXER VEHICLE (71) Applicant: KAYABA INDUSTRY CO., LTD., Minato-ku, Tokyo (JP)

(72) Inventor: Yoshimitsu Takahashi, Saitama (JP)

(73) Assignee: KYB Corporation, Tokyo (JP)

( * ) Notice: Subject to any disclaimer, the term of this patent is extended or adjusted under 35 U.S.C. 154(b) by 155 days.

(21) Appl. No.: 14/777,571

(22) PCT Filed: Mar. 27, 2014

(86) PCT No.: PCT/JP2014/058830
§ 371 (c)(1),
(2) Date: Sep. 16, 2015

(87) PCT Pub. No.: WO2014/157506
PCT Pub. Date: Oct. 2, 2014

(65) Prior Publication Data
US 2016/0250774 A1 Sep. 1, 2016

(30) Foreign Application Priority Data
Mar. 29, 2013 (JP) .................................. 2013-073534

(51) Int. Cl.
*B28C 5/42* (2006.01)
*F02D 29/04* (2006.01)
*B60P 3/16* (2006.01)

(52) U.S. Cl.
CPC ............ *B28C 5/422* (2013.01); *B28C 5/4213* (2013.01); *B28C 5/4272* (2013.01); *B60P 3/16* (2013.01); *F02D 29/04* (2013.01)

(58) Field of Classification Search
CPC ...................................................... B28C 5/422
See application file for complete search history.

(56) References Cited

U.S. PATENT DOCUMENTS

| 2005/0004733 | A1 | 1/2005 | Pillar et al. |
| 2007/0280035 | A1* | 12/2007 | Abe ....................... B28C 5/4213 366/31 |
| 2008/0008025 | A1* | 1/2008 | Abe ....................... B28C 5/4213 366/61 |
| 2009/0171595 | A1* | 7/2009 | Bonilla Benegas ........... B01F 15/00207 702/41 |

(Continued)

FOREIGN PATENT DOCUMENTS

| JP | 2005-343252 A | 12/2005 |
| JP | 2007-278430 A | 10/2007 |

(Continued)

OTHER PUBLICATIONS

International Search Report and Written Opinion dated Apr. 22, 2014 for PCT/JP2014/058830.

*Primary Examiner* — Abbas Rashid
(74) *Attorney, Agent, or Firm* — Hauptman Ham, LLP (57) ABSTRACT

A mixer vehicle provided with a mixer drum mounted on a vehicle, the mixer drum being adapted to load uncured concrete includes a driving device for rotating the mixer drum and a loaded state detector for detecting whether the uncured concrete is loaded on the mixer drum or not. Rotation of the mixer drum by the driving device is stopped if the vehicle is in the stop state and the loaded state detector detects that the uncured concrete is not loaded on the mixer drum.

4 Claims, 5 Drawing Sheets (56) References Cited

U.S. PATENT DOCUMENTS

| | | | |
|---|---|---|---|
| 2009/0282824 A1* | 11/2009 | Ando | B28C 5/4213 |
| | | | 60/449 |
| 2013/0021867 A1 | 1/2013 | Shimizu | |
| 2013/0111892 A1* | 5/2013 | Takahashi | B28C 5/4213 |
| | | | 60/459 |
| 2014/0010036 A1 | 1/2014 | Takahashi et al. | |
| 2014/0013736 A1 | 1/2014 | Takahashi et al. | |
| 2014/0015315 A1* | 1/2014 | Takahashi | B28C 5/4213 |
| | | | 307/10.1 |
| 2014/0198599 A1* | 7/2014 | Kamijo | B28C 5/422 |
| | | | 366/61 |
| 2015/0047335 A1* | 2/2015 | Takahashi | F16H 61/4139 |
| | | | 60/428 |
| 2015/0217481 A1* | 8/2015 | Takahashi | B28C 5/4213 |
| | | | 366/61 |

FOREIGN PATENT DOCUMENTS

| | | |
|---|---|---|
| JP | 2012-201144 A | 10/2012 |
| WO | 2012/128291 A1 | 9/2012 |

* cited by examiner

MIXER VEHICLE

TECHNICAL FIELD

The present invention relates to a mixer vehicle.

BACKGROUND ART

A mixer vehicle provided with a mixer drum capable of loading so-called uncured concrete such as mortar, ready-mixed concrete and the like has been used.

JP2007-278430A discloses a mixer-drum driving device of a mixer vehicle provided with a hydraulic pump driven by an engine of the vehicle and a hydraulic motor for rotating the mixer drum by being operated by an operating oil discharged from the hydraulic pump. In this mixer vehicle, an electric motor capable of rotating the mixer drum when the engine of the vehicle is stopped is provided.

SUMMARY OF INVENTION

However, the mixer vehicle described in JP2007-278430A is configured such that the mixer drum is rotated by the engine when the engine of the vehicle is operated, while the mixer drum is rotated by the electric motor when the engine is stopped. Thus, since the mixer drum is in a rotating state all the time, a consumption amount of energy was large.

The present invention has an object to suppress energy used for rotation of the mixer drum.

According to an aspect of the present invention, a mixer vehicle provided with a mixer drum mounted on a vehicle, the mixer drum being adapted to load uncured concrete, includes a driving device adapted to rotate the mixer drum, and a loaded state detector adapted to detect whether the uncured concrete is loaded on the mixer drum or not. Rotation of the mixer drum by the driving device is stopped if the vehicle is in a stop state and the load state detector detects that the uncured concrete is not loaded on the mixer drum.

DESCRIPTION OF EMBODIMENTS

Embodiments of the present invention will be explained below by referring to the attached drawings.

First Embodiment

Figure 1:
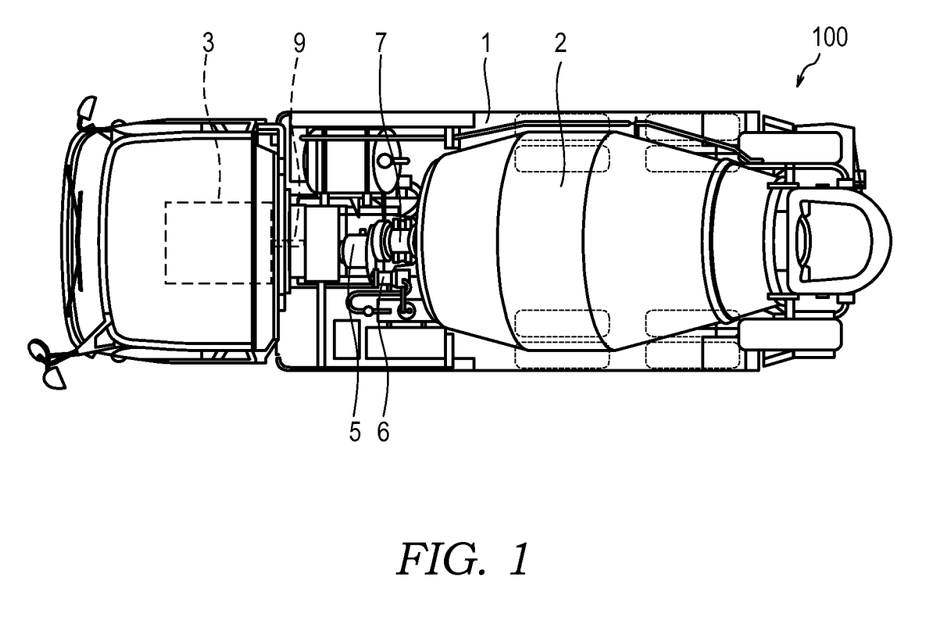
FIG. 1 is a plan view of a mixer vehicle according to an embodiment of the present invention.

A mixer vehicle 100 according to a first embodiment of the present invention will be explained below by referring to FIGS. 1 to 3.

First, by referring to FIG. 1, an entire configuration of the mixer vehicle 100 will be explained.

The mixer vehicle 100 includes an engine 3 for running of a vehicle 1, a mixer drum 2 mounted on the vehicle 1 and capable of loading uncured concrete, and a driving device 4 (see FIG. 2) for rotating the mixer drum 2. The mixer vehicle 100 is to transport uncured concrete loaded in the mixer drum 2.

The mixer drum 2 is a cylindrical container having a bottom rotatably mounted on the vehicle 1. The mixer drum 2 is mounted so that a rotating axis is oriented to a longitudinal direction of the vehicle 1. The mixer drum 2 is mounted with longitudinal inclination so that it becomes gradually higher toward a rear part of the vehicle 1. The mixer drum 2 has an opening portion formed on a rear end thereof so that input and discharge of uncured concrete can be performed through the opening portion.

The mixer drum 2 is supported on the vehicle 1 at three points, that is, a front part to which an output shaft of the driving device 4 is connected and left and right on the rear part. The rear part of the mixer drum 2 is rotatably supported by rollers (not shown).

The mixer drum 2 is rotated by using the engine 3 as a power source. When the vehicle 1 is in a stop state and when uncured concrete is not loaded on the mixer drum 2, rotation of the mixer drum 2 can be stopped by the driving device 4.

Subsequently, by referring to FIG. 2, the driving device 4 will be explained.

The driving device 4 is driven by rotation of the engine 3 and rotates the mixer drum 2 by a fluid pressure of an operating fluid. A rotary motion of a crankshaft in the engine 3 is transmitted to the driving device 4 by a power extraction mechanism 9 for extracting power from the engine 3 all the time.

In the driving device 4, an operating oil is used as the operating fluid. Instead of the operating oil, other non-compressive fluids may be used as the operating fluid. The driving device 4 includes a hydraulic pump 5 as a fluid-pressure pump driven by the engine 3, a hydraulic motor 6 as a fluid-pressure motor rotating the mixer drum 2 by being operated by the operating oil discharged from the hydraulic pump 5, and a switching valve 8 for switching a rotation direction of the hydraulic motor 6. The driving device 4 can rotate the mixer drum 2 forward or backward and can increase or decrease its speed.

The hydraulic pump 5 is rotated by power extracted all the time from the engine 3 through the power extraction mechanism 9. The hydraulic pump 5 is a swash-plate axial piston pump with a variable capacity. The hydraulic pump 5 includes a pilot valve (not shown) for adjusting a tilting angle of a swash plate. The hydraulic pump 5 has its discharge capacity adjusted by the pilot valve.

The operating oil discharged from the hydraulic pump 5 is supplied to the hydraulic motor 6, whereby the hydraulic motor 6 is rotated. To the hydraulic motor 6, the mixer drum 2 is connected through a speed reducer 7. As a result, the mixer drum 2 is rotated with rotation of the hydraulic motor 6.

In the hydraulic pump 5, a pressure sensor 5a as a fluid-pressure detector for detecting a pressure of the discharged operating oil is provided. Instead of provision of the pressure sensor 5a in the hydraulic pump 5, a pressure sensor for detecting the pressure of the operating oil supplied to the hydraulic motor 6 may be provided.

The pressure of the operating oil discharged from the hydraulic pump 5 is changed by a weight of uncured concrete loaded on the mixer drum 2. Thus, on the basis of the pressure of the operating oil detected by the pressure sensor 5a, whether or not the uncured concrete is loaded on the mixer drum 2 can be detected. This pressure sensor 5a corresponds to a loaded state detector.

Figure 2:
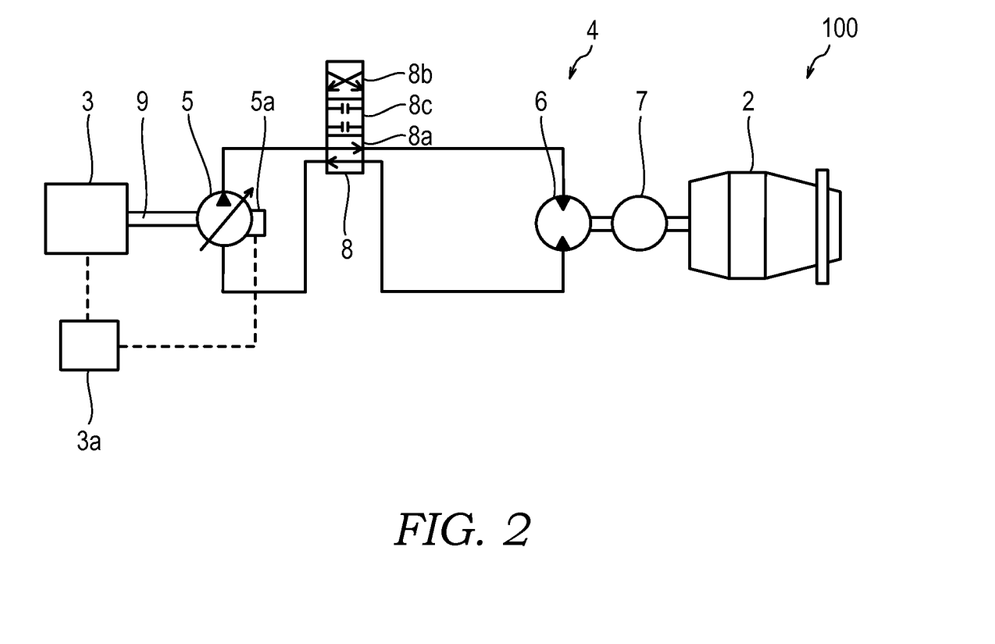
FIG. 2 is a configuration diagram of a driving device of the mixer vehicle according to a first embodiment of the present invention.
Figure 3:
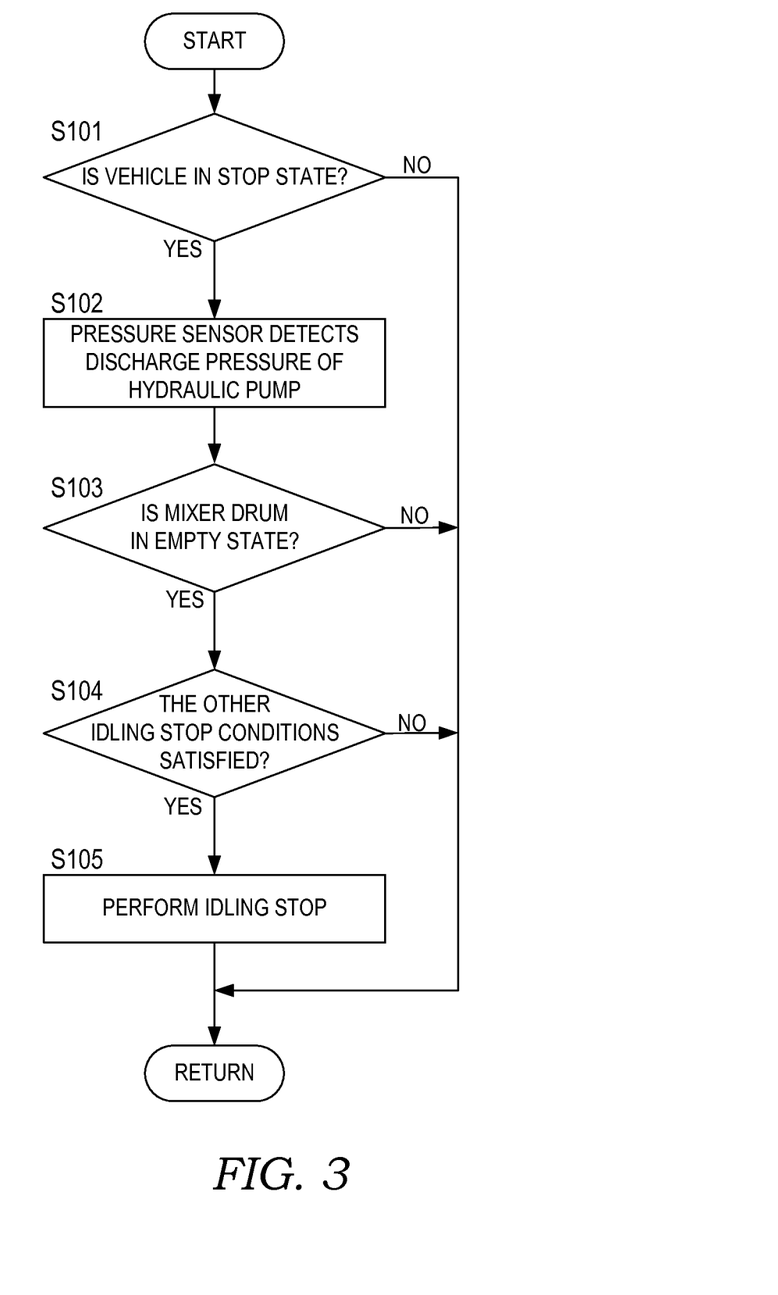
FIG. 3 is a flowchart of rotation stop processing of a mixer drum in the mixer vehicle according to the first embodiment of the present invention.

As illustrated in FIG. 2, the pressure sensor 5a outputs an electric signal to an engine control portion 3a controlling the engine 3 in accordance with the detected pressure of the operating oil.

The hydraulic motor 6 is a swash-plate axial piston motor with a fixed capacity. The hydraulic motor 6 is rotated by receiving supply of the operating oil discharged from the hydraulic pump 5. The hydraulic motor 6 is capable of forward/backward rotation by switching of the switching valve 8. In this embodiment, the hydraulic motor 6 is explained as the swash-plate axial piston motor with a fixed capacity but this is not limiting, and the hydraulic motor 6 may be a swash-plate axial piston motor with a variable capacity.

The switching valve 8 includes a forward rotation position 8a for guiding the operating oil discharged from the hydraulic pump 5 to the hydraulic motor 6 so that the mixer drum 2 is rotated forward, a backward rotation position 8b for guiding the operating oil discharged from the hydraulic pump 5 to the hydraulic motor 6 so that the mixer drum 2 is rotated backward, and a shut-off position 8c for shutting off a flow of the operating oil between the hydraulic pump 5 and the hydraulic motor 6. The switching valve 8 is switched on the basis of operation of a worker.

When the mixer drum 2 is rotated forward by the driving device 4, the uncured concrete in the mixer drum 2 is mixed. On the other hand, when the mixer drum 2 is rotated backward by the driving device 4, the uncured concrete in the mixer drum 2 is discharged to the outside from the opening portion on the rear end.

Subsequently, by referring to FIG. 3, rotation stop processing of the mixer drum 2 in the mixer vehicle 100 will be explained. This routine is repeatedly executed at a certain time interval of 10 milliseconds, for example, in the engine control portion 3a.

In the mixer vehicle 100, rotation stop of the mixer drum 2 is executed by stopping idling operation of the engine 3 (hereinafter referred to as "idling stop"). Thus, the processing explained below is idling stop processing in the mixer vehicle 100.

At Step 101, it is determined whether the vehicle 1 is in a stop state or not. That is, at Step 101, it is determined whether a speed of the vehicle 1 is 0 or not. For this determination, a pulse signal outputted in accordance with rotation of an axle of the vehicle 1 is used, for example.

If it is determined at Step 101 that the vehicle 1 is in the stop state, the routine proceeds to Step 102. On the other hand, if it is determined at Step 101 that the vehicle 1 is not in the stop state, that is, that the vehicle 1 is in a running state, the routine returns and exits the processing.

At Step 102, a pressure of the operating oil discharged from the hydraulic pump 5 is detected by the pressure sensor 5a.

At Step 103, it is determined whether the mixer drum 2 is in an empty state or not. As described above, the pressure of the operating oil discharged from the hydraulic pump 5 is changed by the weight of the uncured concrete loaded on the mixer drum 2. Thus, at Step 103, it is determined whether the pressure of the operating oil detected at Step 102 is not less than a predetermined intensity set in advance.

If it is determined at Step 103 that the mixer drum 2 is in an empty state, the routine proceeds to Step 104. On the other hand, if it is determined at Step 103 that the mixer drum 2 is not in the empty state, that is, the uncured concrete is loaded on the mixer drum 2, the routine returns and exits the processing.

At Step 104, it is determined whether other conditions for executing the idling stop processing of the engine 3 in the vehicle 1 are satisfied or not. The other conditions include that SOC (State of charge) of a battery (not shown) is sufficient, that a load by use of an air conditioner is relatively small, that a cooling water temperature of the engine 3 has reached a proper temperature range and the like.

If it is determined at Step 104 that the other conditions for executing the idling stop processing are satisfied, the routine proceeds to Step 105. On the other hand, if it is determined at Step 104 that the other conditions for executing the idling stop processing are not satisfied, the routine returns and exits the processing.

At Step 105, the idling stop processing is executed. Specifically, at Step 105, the engine control portion 3a stops operation of the engine 3. After the idling stop processing is executed at Step 105, the routine returns and exits the processing.

As described above, the engine 3 performs idling stop if the vehicle 1 is in the stop state and the pressure sensor 5a detects that the uncured concrete is not loaded on the mixer drum 2. When the engine 3 performs idling stop, the hydraulic pump 5 of the driving device 4 is also stopped, and thus, the operating oil is no longer supplied to the hydraulic motor 6. Thus, rotation of the mixer drum 2 is stopped by the idling stop of the engine 3. Therefore, as compared with an instance in which the mixer drum 2 is in a driven state all the time, energy used for rotation of the mixer drum 2 can be suppressed.

Moreover, in the mixer vehicle 100, in a state in which the uncured concrete is loaded on the mixer drum 2, the engine 3 does not perform idling stop, and the rotation of the mixer drum 2 is not stopped. Thus, mixing of the uncured concrete loaded on the mixer drum 2 is not stopped.

Here, in the mixer vehicle 100, if the vehicle 1 is vibrated by irregularity on a road surface or the like, the vibration is also transmitted to the mixer drum 2. At this time, since the mixer drum 2 is to move vertically, a large force is applied to a space between that and the rollers supporting the rear part of the mixer drum 2.

On the other hand, in the mixer vehicle 100, even in a state in which the uncured concrete is not loaded on the mixer drum 2, if the vehicle 1 is in the running state, rotation of the mixer drum 2 is not stopped. Thus, even if the vibration caused by the irregularity on the road surface is transmitted to the mixer drum 2, the force applied to the mixer drum 2 is distributed to the whole circumference. Thus, concentration of the force applied to a space between that and the rollers on a specific spot only on the mixer drum 2 is prevented.

According to the first embodiment described above, the following effect is exerted.

In the mixer vehicle 100, if the vehicle 1 is in the stop state and the uncured concrete is not loaded on the mixer drum 2, the rotation of the mixer drum 2 can stop by idling stop of the engine 3. Therefore, as compared with the instance in which the mixer drum 2 is in the rotating state all the time, energy used for rotation of the mixer drum 2 can be suppressed.

Second Embodiment

Figure 4:
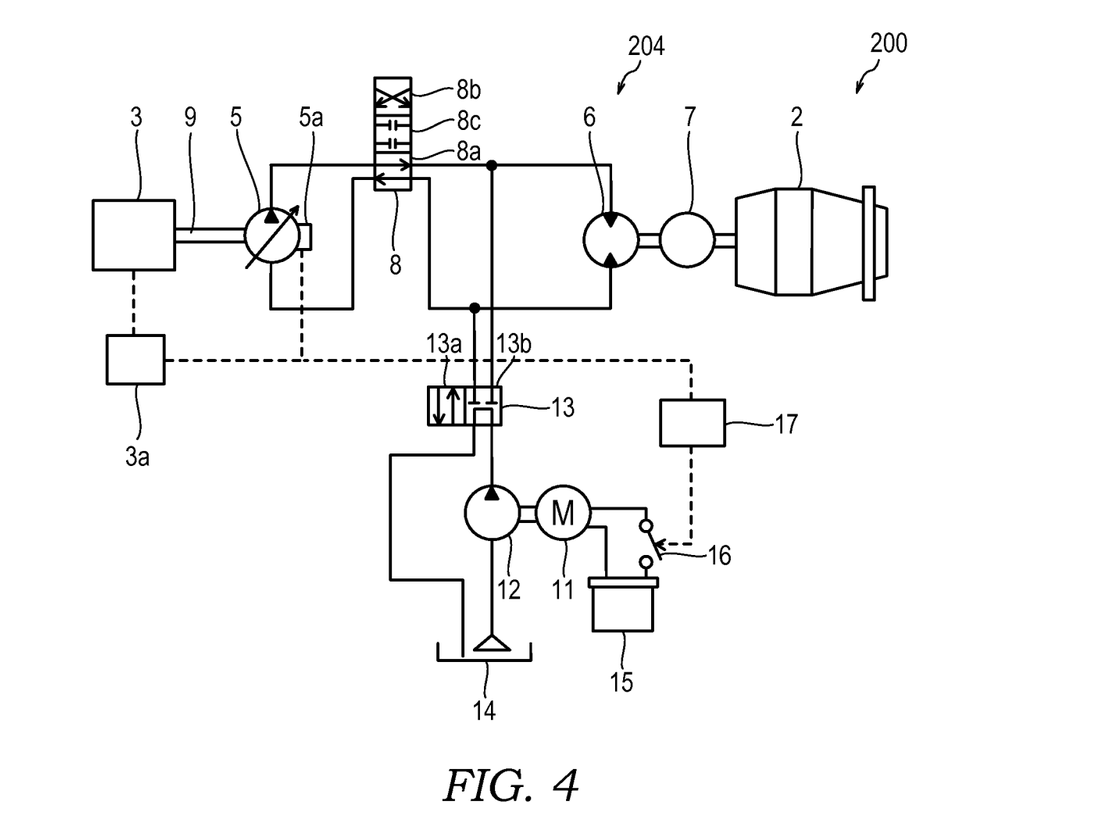
FIG. 4 is a configuration diagram of a driving device of a mixer vehicle according to a second embodiment of the present invention.
Figure 5:
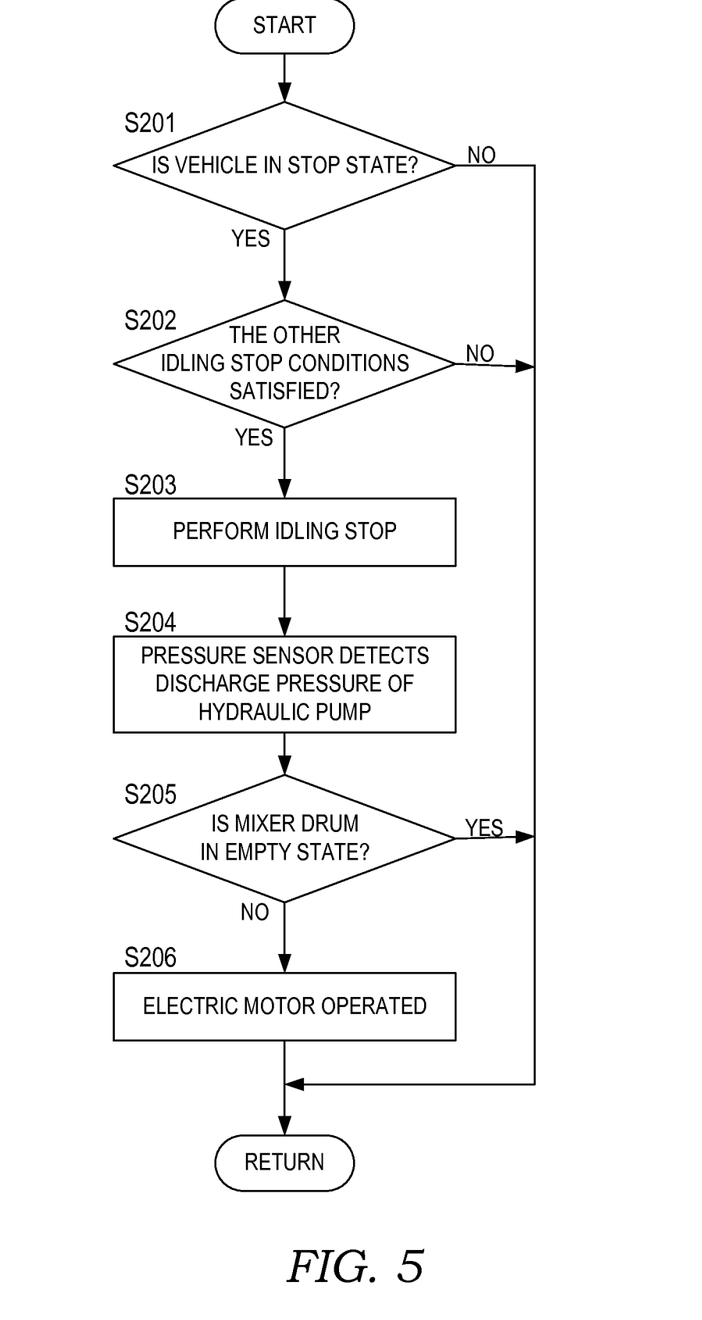
FIG. 5 is a flowchart of rotation stop processing of a mixer drum in the mixer vehicle according to the second embodiment of the present invention.

By referring to FIGS. 4 and 5, a mixer vehicle 200 according to a second embodiment of the present invention will be explained below. In the second embodiment, the same reference numerals are given to the configurations similar to those in the above-described first embodiment, and duplicated explanation will be omitted as appropriate.

The second embodiment is different from the above-described first embodiment in a point that the mixer drum 2 can be rotated not only by the hydraulic pump 5 driven by the engine 3 but also by an auxiliary hydraulic pump 12 driven by an electric motor 11.

The mixer vehicle 200 includes the engine 3 for running of the vehicle 1, the mixer drum 2 mounted on the vehicle 1 and capable of loading uncured concrete, and a driving device 204 for rotating the mixer drum 2. The driving device 204 is driven by rotation of the engine 3 or rotation of the electric motor 11 and rotates the mixer drum 2 by a hydraulic pressure of the operating oil.

The driving device 204 includes the hydraulic pump 5 driven by the engine 3, the hydraulic motor 6 rotating the mixer drum 2 by being operated by the operating oil discharged from the hydraulic pump 5, and the switching valve 8 for switching the rotation direction of the hydraulic motor 6.

Moreover, the driving device 204 includes the electric motor 11 rotated by electric power, the auxiliary hydraulic pump 12 as an auxiliary fluid-pressure pump for discharging the operating oil by being driven by rotation of the electric motor 11 and for operating the hydraulic motor 6, a switching valve 13 for switching between supply or non-supply of the operating oil discharged from the auxiliary hydraulic pump 12 to the hydraulic motor 6, a tank 14 in which the operating oil can be reserved, a battery 15 for supplying electric power to the electric motor 11, a switch 16 for switching a driving state of the electric motor 11, and a control portion 17 for executing switching control of the switch 16.

The electric motor 11 rotates only in one direction by using the electric power stored in the battery 15. The output shaft of the electric motor 11 is connected to a rotating shaft of the auxiliary hydraulic pump 12. The engine 3 drives the hydraulic pump 5 if the vehicle 1 is in the running state similarly to the mixer vehicle 100 according to the first embodiment. On the other hand, the electric motor 11 can drive the auxiliary hydraulic pump 12 when the vehicle 1 is in the stop state and when the engine 3 performs idling stop.

The auxiliary hydraulic pump 12 sucks the operating oil reserved in the tank 14 and discharges it toward the hydraulic motor 6. The auxiliary hydraulic pump 12 can rotate the hydraulic motor 6 forward by the discharged operating oil.

The electric motor 11 and the auxiliary hydraulic pump 12 rotates the mixer drum 2 so that mixing of the uncured concrete loaded on the mixer drum 2 is not stopped when the engine 3 performs idling stop. Thus, the electric motor 11 and the auxiliary hydraulic pump 12 do not have to rotate the mixer drum 2 backward and rotate only in the one direction.

The switching valve 13 includes a forward rotation position 13a for guiding the operating oil discharged from the auxiliary hydraulic pump 12 to the hydraulic motor 6 so that the mixer drum 2 is rotated forward and a return position 13b for returning the operating oil discharged from the auxiliary hydraulic pump 12 to the tank 14 without supplying it to the hydraulic motor 6. The switching valve 13 is an electromagnetic switching valve subjected to switching control by the control portion 17.

The switch 16 can connect the electric motor 11 and the battery 15 in series. When the switch 16 is connected, the electric motor 11 and the battery 15 are connected in series, and the electric motor 11 rotates. On the other hand, when the switch 16 is opened, the connection between the electric motor 11 and the battery 15 is disconnected, and the rotation of the electric motor 11 is stopped.

The control portion 17 is constituted by a microcomputer including a CPU (central processing unit), a ROM (read only memory), a RAM (random access memory), and an I/O interface (input/output interface). The RAM stores data in processing of the CPU, the ROM stores a control program and the like of the CPU in advance, and the I/O interface is used for input/output of information with respect to the connected devices.

The control portion 17 switches between connection and opening of the switch 16. Moreover, the control portion 17 can switch between the switching valve 13 and the switching valve 8, though not shown. In the mixer vehicle 200, not only the switching valve 13 but also the switching valve 8 is an electromagnetic switching valve.

Subsequently, by referring to FIG. 5, rotation stop processing of the mixer drum 2 in the mixer vehicle 200 will be explained. This routine is repeatedly executed at a certain time interval of 10 milliseconds, for example, in the engine control portion 3a and the control portion 17.

At Step 201, it is determined whether the vehicle 1 is in the stop state or not. If it is determined at Step 201 that the vehicle 1 is in the stop state, the routine proceeds to Step 202. On the other hand, if it is determined at Step 201 that the vehicle 1 is not in the stop state, that is, that the vehicle 1 is in the running state, the routine returns and exits the processing.

At Step 202, it is determined whether other conditions for executing the idling stop processing of the engine 3 in the vehicle 1 are satisfied or not. If it is determined at Step 202 that the other conditions for executing the idling stop processing are satisfied, the routine proceeds to Step 203. On the other hand, if it is determined at Step 202 that the other conditions for executing the idling stop processing are not satisfied, the routine returns and exits the processing.

At Step 203, the idling stop processing is executed. Specifically, at Step 203, the engine control portion 3a stops operation of the engine 3. After the idling stop processing is executed at Step 203, the routine proceeds to Step 204.

At Step 204, the pressure of the operating oil discharged from the hydraulic pump 5 is detected by the pressure sensor 5a.

At Step 205, it is determined whether the mixer drum 2 is in the empty state or not. If it is determined at Step 205 that the mixer drum 2 is not in the empty state, that is, that the uncured concrete is loaded on the mixer drum 2, the routine proceeds to Step 206. On the other hand, if it is determined at Step 205 that the mixer drum 2 is in the empty state, the routine returns and exits the processing.

At Step 206, the electric motor 11 is operated. As a result, the auxiliary hydraulic pump 12 is driven and discharges the operating oil. At this time, the control portion 17 switches the switching valve 13 to the forward rotation position 13a and also switches the switching valve 8 to the shut-off position 8c. Thus, the operating oil discharged from the auxiliary hydraulic pump 12 is supplied to the hydraulic motor 6, and thus, the mixer drum 2 rotates forward.

As described above, the engine 3 performs idling stop if the vehicle 1 is in the stop state. If the engine 3 performs idling stop, the hydraulic pump 5 of the driving device 4 is also stopped. However, even if the engine 3 performs idling stop, when the pressure sensor 5a detects that the uncured concrete is loaded on the mixer drum 2, the electric motor 11 is operated. Thus, the auxiliary hydraulic pump 12 is driven by the electric motor 11, and the operating oil discharged from the auxiliary hydraulic pump 12 is supplied to the hydraulic motor 6. Therefore, the mixer drum 2 can continue rotating in the forward rotation direction.

On the other hand, if the vehicle 1 is in the stop state and the pressure sensor 5a detects that the uncured concrete is not loaded on the mixer drum 2, the engine 3 becomes capable of idling stop and the electric motor 11 is stopped. That is, if the engine 3 performs idling stop and the pressure sensor 5a detects that the uncured concrete is not loaded on the mixer drum 2, the electric motor 11 is not operated. Thus, the mixer drum 2 stops rotation. Therefore, as compared with the instance in which the mixer drum 2 is in the driving state all the time, energy used for rotation of the mixer drum 2 can be suppressed.

In the above-described second embodiment, too, if the vehicle 1 is in the stop state and the uncured concrete is not loaded on the mixer drum 2, the engine 3 performs idling stop and the electric motor 11 is stopped, whereby rotation of the mixer drum 2 can be stopped. Therefore, as compared with the instance in which the mixer drum 2 is in the rotation state all the time, energy used for rotation of the mixer drum 2 can be suppressed.

Moreover, in the mixer vehicle 200, in a state in which the uncured concrete is loaded on the mixer drum 2, the electric motor 11 is operated even if the engine 3 performs idling stop. Thus, the auxiliary hydraulic pump 12 is driven by the electric motor 11, and the operating oil discharged from the auxiliary hydraulic pump 12 is supplied to the hydraulic motor 6 and thus, rotation of the mixer drum 2 is not stopped. Thus, mixing of the uncured concrete loaded on the mixer drum 2 is not stopped.

Although an embodiment of the present invention has been described, the embodiment is merely one of application examples of the present invention and by no means limits the technical scope of the present invention to a specific configuration of the above-mentioned embodiment.

For example, the above-described rotation stop processing of the mixer drum 2 may be applied to an electronically controlled mixer vehicle provided with a control device for electronically controlling operation of the driving device 4. In this case, the control device transmits a signal allowing idling stop to the engine control portion 3a if the vehicle 1 is in the stop state and the uncured concrete is not loaded on the mixer drum 2. The engine control portion 3a can perform idling stop of the engine 3 if the other conditions for executing the idling stop processing are satisfied upon receipt of the signal from the control device.

Moreover, in the above-described embodiment, the rotation stop control of the mixer drum 2 is executed by the engine control portion 3a and the control portion 17. Instead of this, a control portion for executing the rotation stop control of the mixer drum 2 may be provided separately.

Moreover, in the above-described embodiment, the pressure sensor 5a for detecting a discharge pressure of the hydraulic pump 5 is used as a loaded state detector. Instead of this, a weight detector for detecting a weight of the mixer drum 2 may be provided as a loaded state detector. As the weight detector, a sensor such as a load cell and the like provided at least at any one of three spots supporting the mixer drum 2, for example, is used.

This application claims priority to Japanese Patent Application No. 2013-073534 filed in the Japanese Patent Office on Mar. 29, 2013, the entire contents of which are incorporated by reference herein.

The invention claimed is:

1. A mixer vehicle, comprising:
   a vehicle;
   a mixer drum mounted on the vehicle, the mixer drum being adapted to load uncured concrete;
   a driving device adapted to rotate the mixer drum;
   a loaded state detector adapted to detect whether the uncured concrete is loaded on the mixer drum or not; and
   a controller programmed to stop rotation of the mixer drum by the driving device when the vehicle is in a stop state and the loaded state detector detects that the uncured concrete is not loaded on the mixer drum, the mixer vehicle further comprising an engine for running the vehicle, wherein the driving device includes: a fluid-pressure pump configured to be driven by the engine; and a fluid-pressure motor configured to be operated by an operating fluid discharged from the fluid-pressure pump and to rotate the mixer drum, wherein the loaded state detector is a fluid-pressure detector adapted to detect a fluid pressure of the fluid-pressure pump or the fluid-pressure motor, wherein the controller is programmed to stop the rotation of the mixer drum by stopping an idling operation of the engine.

2. The mixer vehicle according to claim 1, wherein the driving device further includes:
   an electric motor configured to be rotated by electric power; and
   an auxiliary fluid-pressure pump configured to be driven by rotation of the electric motor and to discharge an operating fluid and to operate the fluid-pressure motor, wherein the controller is programmed to
   cause the engine to drive the fluid-pressure pump when the vehicle is in a running state; and
   cause the electric motor to drive the auxiliary fluid-pressure pump if the vehicle is in the stop state and the engine stops an idling operation.

3. The mixer vehicle according to claim 2, wherein when the vehicle is in the stop state and the loaded state detector detects that the uncured concrete is not loaded on the mixer drum, the controller is programmed to
   cause the engine to stop the idling operation and
   stop the electric motor.

4. The mixer vehicle according to claim 2, further comprising:
   a control device adapted to control operation of the driving device, wherein
   the controller is programmed to cause the control device to transmit a signal allowing stop of an idling operation of the engine to an engine control portion adapted to control the engine, when the vehicle is in the stop state and the loaded state detector detects that the uncured concrete is not loaded on the mixer drum.

* * * * *